Jan. 23, 1934.    G. A. BERGSTROM    1,944,631
SHINGLE FACING MACHINE
Filed Oct. 3, 1932    6 Sheets-Sheet 1
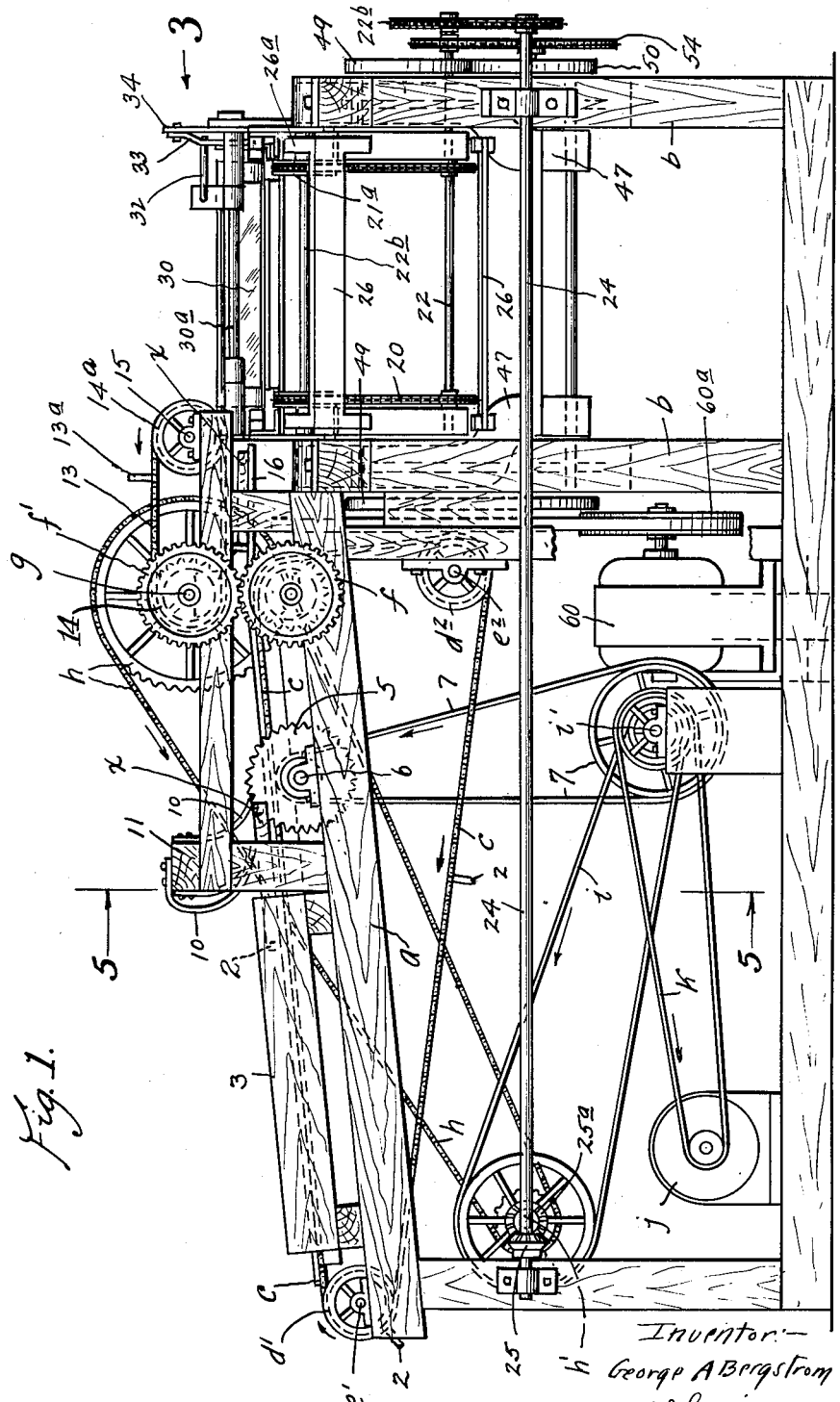

Jan. 23, 1934.　　G. A. BERGSTROM　　1,944,631
SHINGLE FACING MACHINE
Filed Oct. 3, 1932　　6 Sheets-Sheet 2
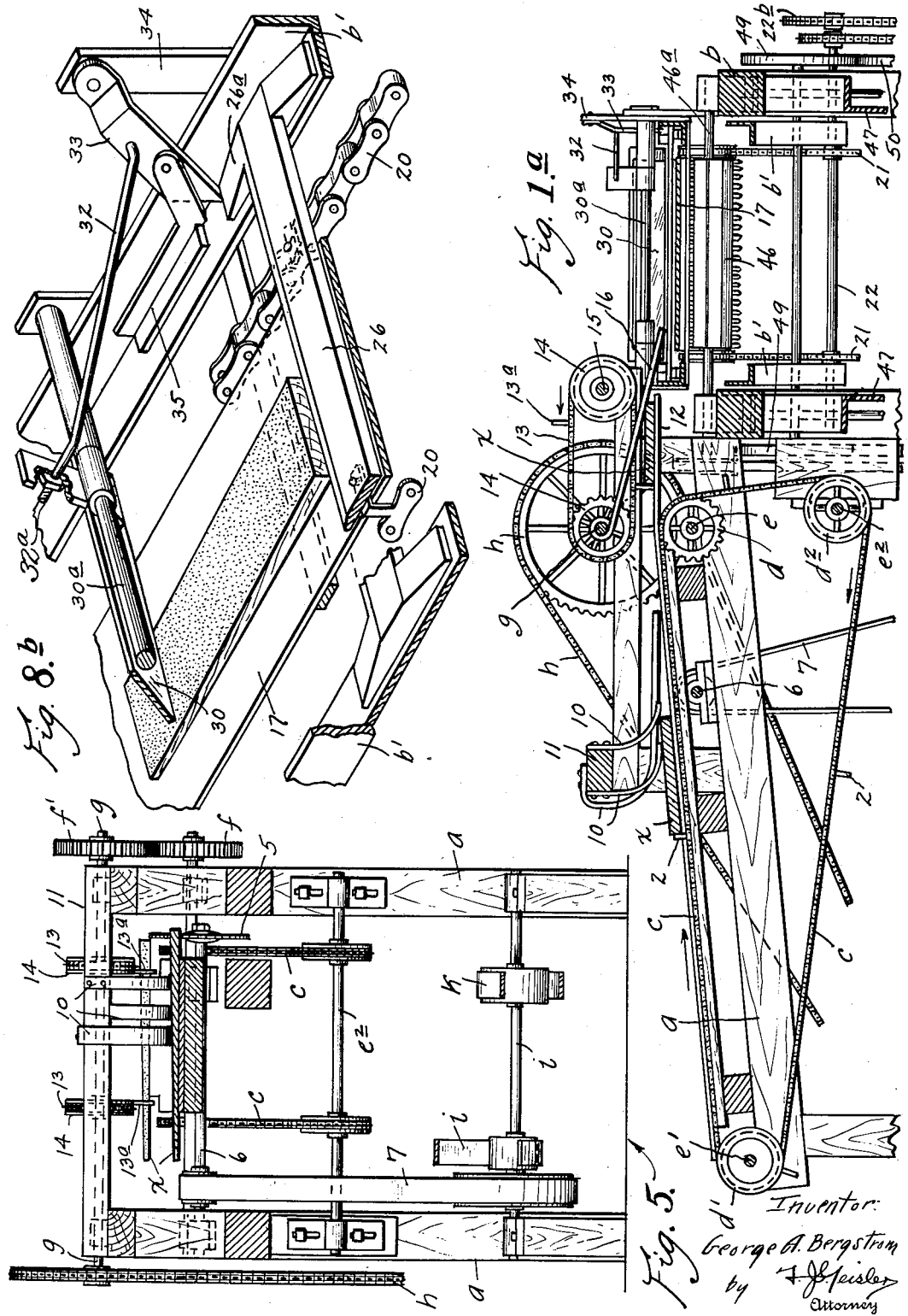

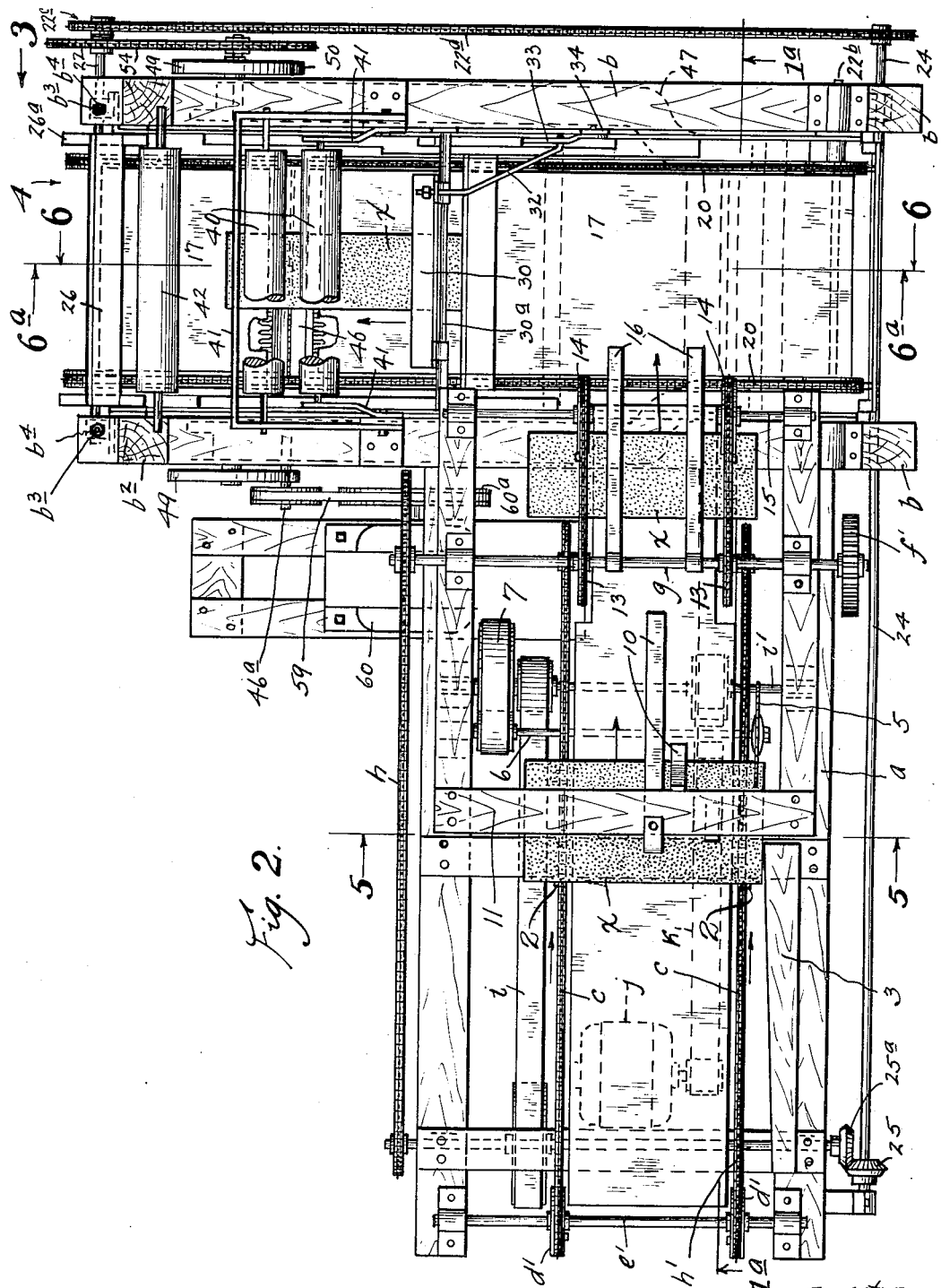

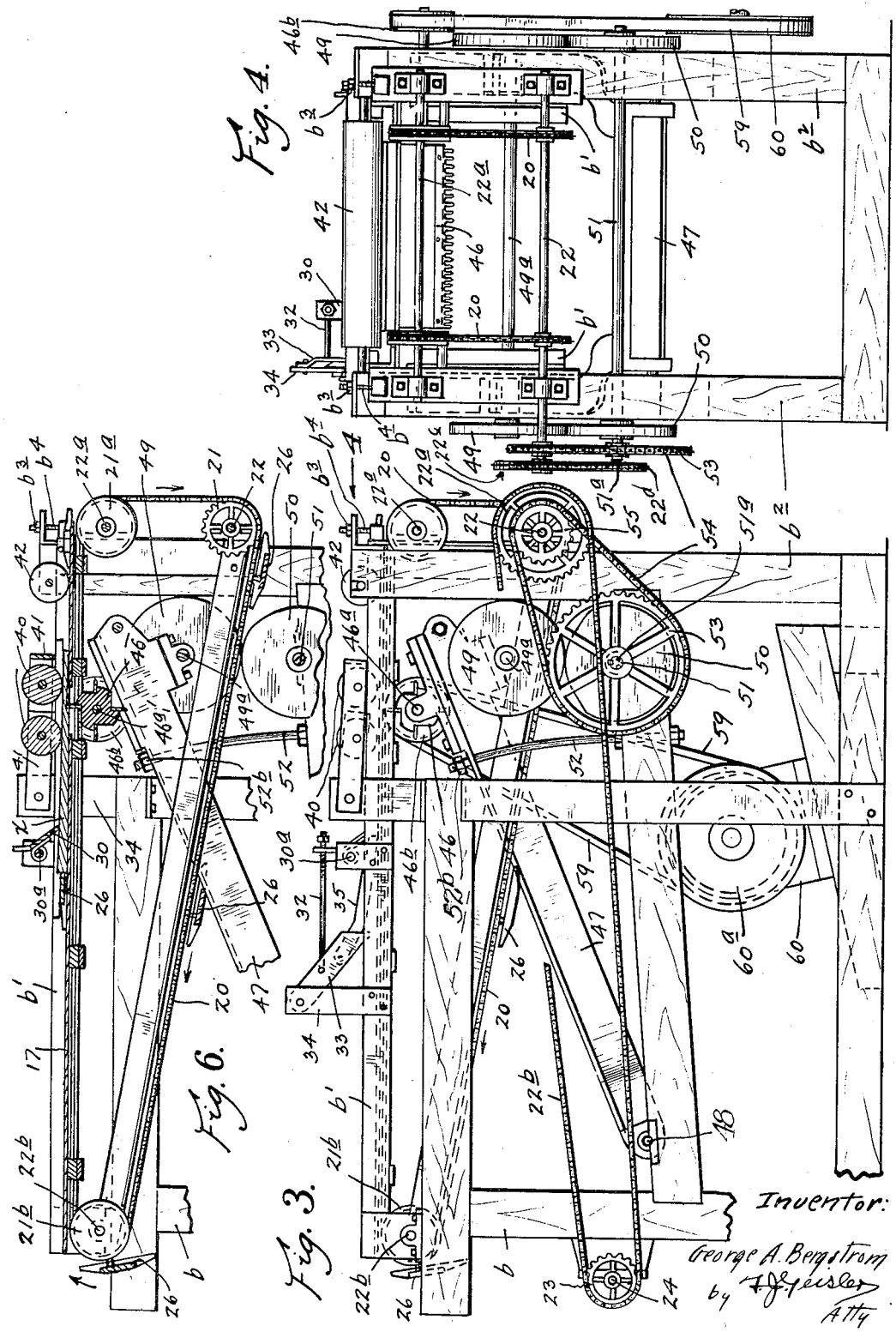

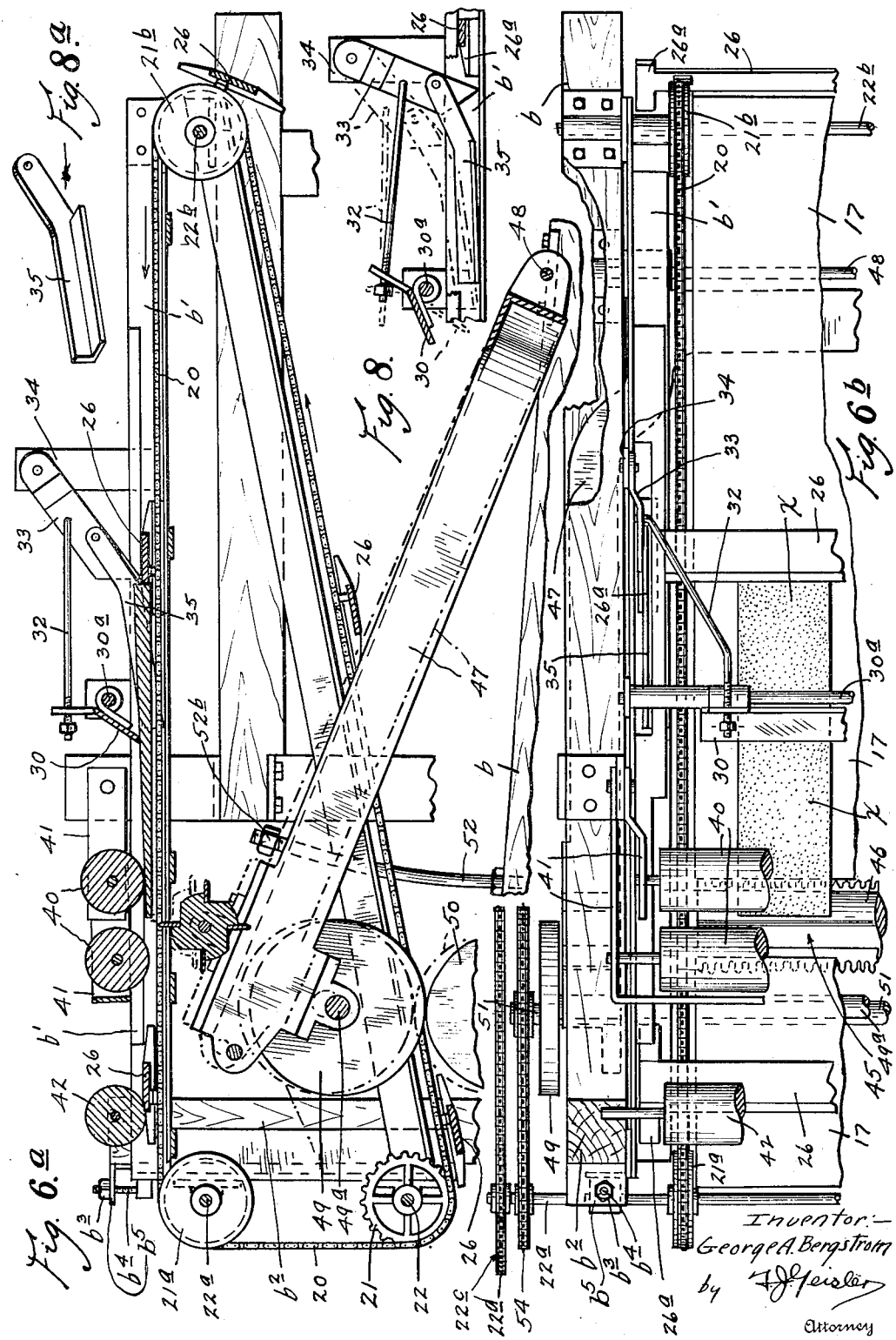

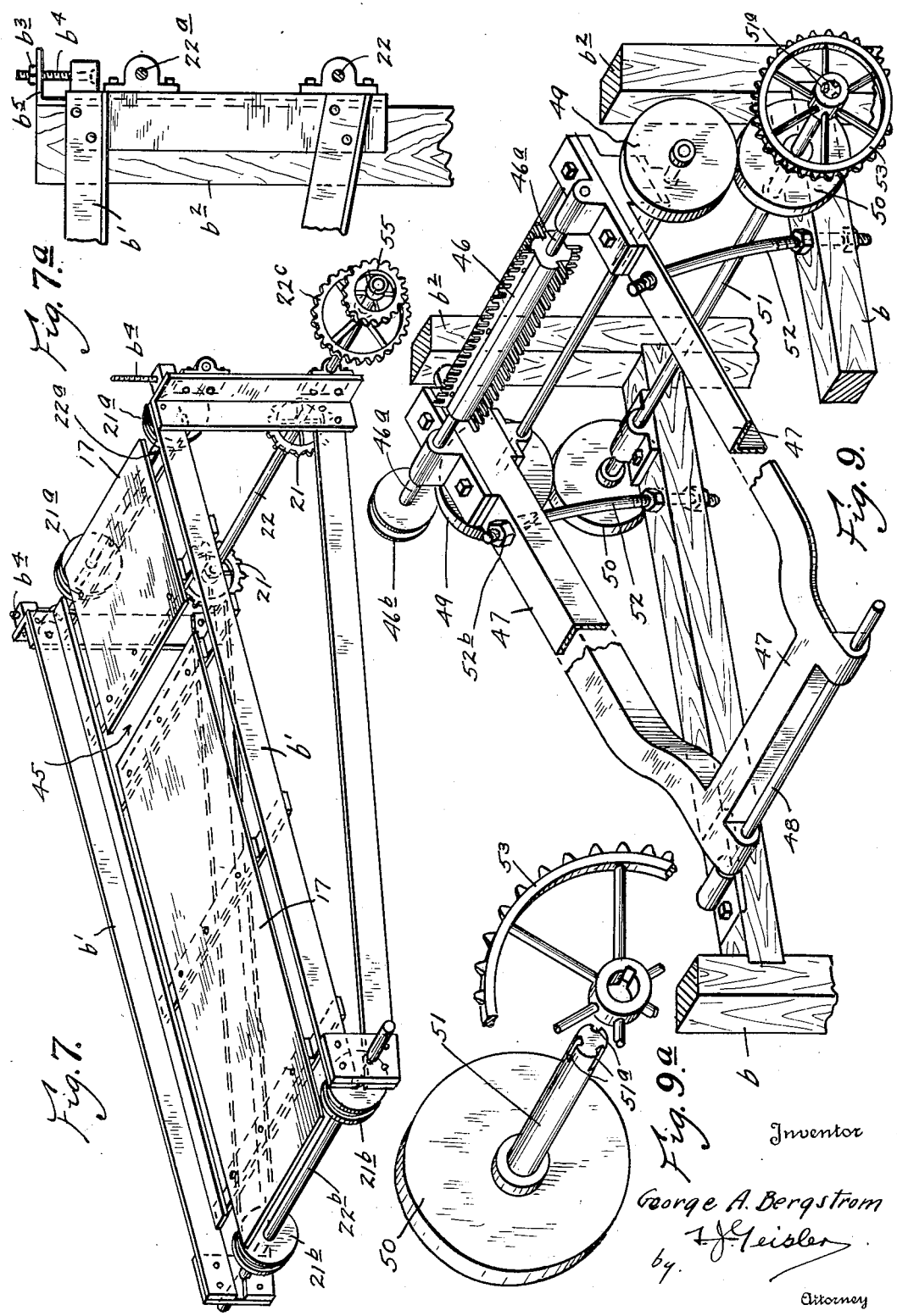

Patented Jan. 23, 1934

1,944,631

UNITED STATES PATENT OFFICE 1,944,631

SHINGLE FACING MACHINE

George A. Bergstrom, Everett, Wash.

Application October 3, 1932. Serial No. 635,990

8 Claims. (Cl. 144—13)

My invention relates to machines for facing or grooving the conventional machine-sawed shingles, so as to give them a rustic, or so-called "shake shingle" appearance; a portion of the tip of the shingle being left unfaced to permit a weather tight contact of that portion of the shingle being made, with the under-surface of the roof or walls of the building on which the shakes are used.

The purpose of my invention is to provide a machine that will do the work rapidly, at the same time in an efficient manner; a machine automatic in its character, in that it requires only the placing of the shingles to be faced in the machine and the removing of them after having been faced.

Further, to include in the machine means for trimming the butt end of the shingles while they are on their passage to the facing mechanism.

To this end my machine comprises three co-operating mechanisms; namely a shingle feeding mechanism; a shingle trimming mechanism included in the shingle feeding mechanism; and a shingle facing mechanism; the first and last mechanisms being synchronized so that the feeding of the shingles to the facing mechanism will always be timed to the rate at which the facing mechanism does its work.

The shingle facing machines with which I am familiar in the prior art were not efficient in my opinion for the following reasons: The machine comprises a vertically movable shingle table over which the shingle is moved past the grooving or facing element, the table having an opening thru which the grooving element projects when the table is in its down position.

The table had to be a sturdy structure to prevent racking and to carry the shingle conveying mechanism.

The combined weight on the table and the shingle moving devices is quite considerable and this weight has to be lifted by a cam element, the lowering being by gravity. This causes more or less pounding and wear of the cam element and after a time rendered the grooving of the shingle as to depth inaccurate; at times such conditions were prone to render the grooves too deep, weakening, and even splitting the shingle.

The primary objects of my invention are: To provide efficient shingle facing mechanism, namely (1) to make the work table rigid, and move the shingle facing element, or cutter-head, to and from its work, thus to provide a lighter operating element; (2) to provide means for adjusting the plane of the work table, and thus the depth of cut of the cutter-head; (3) to provide an adjustment for the cutter-head raising and lowering mechanism, so as to synchronize it with the variable lengths of shingles; (4) to hold the cutter-head firmly while in its grooving position, to prevent chattering; by these means to assure the efficient operation of the cutter head; (5) in combination with said means to provide for the holding of the shingles firmly down on the work table while being operated upon by the cutter-head; and (6) to provide shingle feeding mechanism synchronized with the shingle facing mechanism.

The above described objects I attain by the devices and combinations hereinafter set forth and claimed, referring to the accompanying drawings as a part of this specification.

In the drawings:

Fig. 1 shows a side elevation of my shingle facing machine looking at one side of the shingle feeding mechanism and the feeding end of the shingle facing mechanism;

Fig. 1a shows a partial section on the line 1a of Fig. 2;

Fig. 2 shows a plan or top view corresponding with Fig. 1;

Fig. 3 shows a side elevation of the shingle facing mechanism, looking in the direction pointed by the arrows 3 in Figs. 1 and 2;

Fig. 4 shows an end view of the shingle facing mechanism looking in the direction pointed by the arrows 4 in Figs. 2 and 3;

Fig. 5 shows a transverse section of the shingle feeding mechanism taken on the lines 5—5 of Figs. 1 and 2;

Fig. 6 shows a sectional detail of the shingle facing mechanism, this figure corresponding with Fig. 3 and the section being taken on the line 6—6 of Fig. 2;

Fig. 6a shows a larger scale partial longitudinal section corresponding with Fig. 6, but taken looking in the direction indicated by the arrow 6a in Fig. 2;

Fig. 6b shows a fragmentary partial plan or top view corresponding with Fig. 6a;

Fig. 7 shows a perspective detail of the adjustable table including some of the devices for conveying the shingles over the table;

Fig. 7a shows a larger scale fragmentary detail of the table and illustrates the means for adjusting the position of the table;

Fig. 8 shows a side elevation of a detail of the gravity bar devices for holding the shingle down on the table while being operated upon by the cutter head;

Fig. 8a shows a perspective detail of one of the parts included within the mechanism shown by Fig. 8;

Fig. 8b shows a larger scale partial perspective detail of the devices for conveying the shingles over the table and holding them down on the same while being faced by the cutter head;

Fig. 9 shows a partial perspective detail of the oscillated frame carrying the cutter head; also shows the cam and roller means provided for raising and lowering the free end of the oscillated frame, and the means for holding the latter firmly while raised to bring the cutter head into operating position; and Fig. 9a shows a detail of the means for adjusting the cam element relatively to the length of shingle to be faced.

My machine, referring first to Figs. 1 and 2, comprises two main frame sections a, b, arranged at right angles, and each supporting a work table top. Section a carries the shingle feeding and trimming mechanism, and section b the shingle facing or grooving means.

The shingle feeding means comprises longitudinally operating endless conveyor chains c, the upper courses of which run in the upper surface of the table. The chains c are mounted upon driven sprockets d and rollers d', d2, carried by shafts e, e', e2, respectively, suitably journaled on the table.

The shaft e is driven by a gear f meshing with a gear f' carried upon the end of a shaft g, in turn driven by a chain and sprocket connection h, from a shaft h', which in turn is driven by a belt and pulley connection i from a shaft i', the latter driven by belt k from a motor j.

The conveyor chains c are provided with spaced shingle engaging lugs 2 and are adapted to have a shingle x placed transversely thereon with its butt end bearing against an inwardly converging guide rail 3 so that as the shingles are carried forward by the chains c, they are moved slightly inward and brought into line to be operated upon by a trimmer saw 5 and thus have their butt ends squared. The saw 5 is mounted upon a shaft 6 driven thru a belt and pulley connection 7 from the said driven shaft i'.

A series of yieldable presser bars 10 of graduated lengths are provided on a cross member 11 above the path of the shingles and adapted to bear on the latter and hold them firmly while being operated upon by the trimmer saw 5.

In advance of the trimmer saw 5 and the chains c is provided a slideway 12 leading to the table section b. Secondary chains 13, see Fig. 1a, are mounted above the shingles over such slideway running on sprockets and rollers 14 mounted respectively on the driven shaft g and on a shaft 15. Such chains are provided with shingle engaging lugs 13a adapted to move the shingle forwardly and discharge it onto the table section b. Presser bars 16 are loosely mounted on the shaft g and hold the shingles in place under the said chains 13.

Section b, see Figs. 2 and 7, is provided with plates 17 forming the table top and with endless conveyor chains 20 the upper courses of which run on the edges of the said table top and over driven sprocket 21 and rollers 21a and 21b mounted, respectively, on shafts 22, 22a and 22b. The shaft 22 is driven by sprocket 22c mounted thereon, and sprocket chain 22d running the length of the section b, see Fig. 2, and over sprocket 23, mounted on the end of a shaft 24 which extends the length of section a, see Figs. 1 and 2. The shaft 24 is provided on its opposite end with a bevel gear 25, meshing with a similar gear 25a mounted on the driven shaft h' of section a. By these means the conveyor chains c and 20 of sections a and b carry the shingles at a uniform rate thru the machine.

The conveyor chains 20 of section b, the shingle facing mechanism, are provided with shingle engaging cross bars 26 moving over the table top 17 and are adapted to engage the butt end of the shingles as they are successively discharged from the table of the shingle feeding section a, by the secondary sprocket chains 13; and the shingles are moved serially tip first over the work opening 45, of the table top 17, thus in position to be acted upon and grooved by the cutter head 46.

Presser members, see Fig. 8b, are provided for holding the shingles firmly while in contact with the cutter head 46: They comprise a presser bar 30 pivotally mounted on a transverse rock shaft 30a and adapted to bear on the said shingle by its own weight. The presser bar 30 is loosely connected to a rod 32 provided with a nut 32a on its end and to links 33 pivoted on standards 34 mounted on the table rails b'. The links 33 are adapted to be engaged by the beveled cross head 26a on the adjacent end of the cross bars 26 so that normally the presser bar 30 is held in raised position by the rod 32, but as the link 33 is raised by the cross head passing thereunder, the rod 32 is moved forward and permits the presser bar 30 to rest by its own weight on the shingle, thus holding it firmly as it is brought into contact with the cutter head.

A lever 35, pivotally connected to the links 33 is adapted to be raised by the cross head 26a after it has passed from under the links 33 and prevents the cross bar 30 from being lifted off the shingle after the cross head has passed the links 33.

Presser rolls 40, see Figs. 6 and 6a, mounted on pivoted arms 41 are provided forward of the presser bar 30 and are adapted to hold the shingle in contact with the cutter head. A vertically movable presser roll 42 is provided for the same purpose forward of the rolls 40 to insure that the shingle will be held firmly in contact with the cutter head.

The table top 17 of section b is provided with a transverse work opening 45 thru which projects the rotary grooving cutter head 46 carried on one end of the oscillated frame 47, see Fig. 9. The cutter head 46 carries a plurality of profile knives. It is driven by a belt 59 running on the pulley 46b, on the shaft 46a of the cutter head and on the pulley 60a of the electric motor 60. The motor 60 is so arranged relatively to the shaft 46a of the cutter head 46 that it is as nearly as possible on the radius of the arc of movement of the cutter head and thus the tendency of the belt to stretch during the upward movement of the cutter head is substantially reduced. The oscillated frame 47 is pivotally mounted on the main frame of section b on a shaft 48, and its other or free end is provided at the sides with rollers 49 mounted on a shaft 49a and riding on cam rollers 50 mounted on a transverse shaft 51 journaled on said main frame.

Guide rods 52 having adjustable nuts 52b on their upper ends limit the upper movement of the oscillated frame 47 and therewith the cutter head (see Figs. 3, 6, 6a and 9).

The arrangement of the parts controlling the movement of the cutter head is such as to form a triangle, with the oscillated frame 47 as one side, the combination of the rollers 49 and the cams 50 as another side, and the member of the main frame, on which the cams are journaled and the oscillated frame is pivoted as the third side or base. This arrangement presents a very rigid construction. Hence, by the adjustment of the nuts 52b on the guide-rods 52, the upward movement of the pivoted, oscillated frame 47 is not only limited, but while lifted to its uppermost position—the working position of the cutter head 46—the oscillated frame 47, and therewith the cutter head, is rigidly held by its rollers 49 firmly resting on the cams 50, all chattering of the cutter head is prevented, and the depth of cut made in the shingle may be adjusted as desired, and is controlled.

The shaft 51 of the cam rollers 50 is driven by a sprocket 53 and chain 54 from sprocket 55 mounted on the shaft 22, and the cam rollers are thus operated in time with the conveyor chains of the feeding section a, so as to lift the cutter head 46 just after the tip of the shingle has passed over the opening 45 and the cutter head is thus placed in position to groove the surface of the shingle, except the tip, to produce the imitation shake shingle.

*Operation*

The operator standing beside the shingle feeding section a places the shingle transversely on the chains c with the butt end against the guide rail 3 so that as the shingle is carried forward it is first brought against the trimmer saw 5 to have its butt squared, then it is discharged onto the table top of section b, and is carried forward into contact with the cutter head 46, which is oscillated by cam rollers which are so timed with the conveyor chains 20 that the tip of the shingle has passed over the work opening of the table 17 before the shingle is grooved or faced by the cutter head.

It is to be noted that the movement of the cutter head to the shingle is approximately only ½ inch to clear the shingle, and thus there is but little strain on the shingle facing element of the machine, and the amount of power required for its operation.

For regulating the depth of cut of the cutter head 46, the frame or rails b' of the work table 17, are vertically adjustable by means of nuts b3 threaded on rods b4 provided on the frame b', the bolts suspending one end of the work table 17 adjustably from the brackets b5 affixed to the main frame members b2.

In Fig. 9a is illustrated how the cam rollers 50 may be positioned on the shaft 51 relatively to the driving sprocket 53; the shaft 51 having a number of key-ways 51a. Thus by timing of the cam rollers relatively to the action of the conveyor chains 20, my machine may be adjusted for shingles of greater or lesser length.

I claim:

1. A shingle facing machine comprising a shingle facing section, and a shingle feeding section timed to deliver shingles successively to the shingle facing section, the latter comprising, a main frame supporting a rigid work-table provided with a work opening, and means for successively placing and firmly holding shingles over said work opening, a vertically oscillated frame pivoted at one end on said main frame, a driven cutter head carried by the free end of said oscillated frame, means, timed with said shingle placing means, operating said oscillated frame to place the cutter head in and out of cutting position, and means cooperating with the main frame, the oscillated frame and the means for oscillating the latter to form a triangular rigid frame firmly holding the oscillated frame against chattering while the cutter head is in cutting position.

2. In a shingle facing machine, a main frame supporting a rigid work table provided with a work opening, means for successively placing and firmly holding shingles over said work opening, a vertically oscillated frame pivoted at one end on said main frame, a driven cutter head carried by the free end of said oscillated frame, a driven cam element timed with said shingle placing means, a roller element supporting the free end of said oscillated frame on said cam element, means for holding said roller element firmly on said cam element while the cutter head is in working position.

3. In a shingle facing machine, a main frame supporting a rigid work table provided with a work opening, means for successively placing and firmly holding shingles over said work opening, a vertically oscillated frame pivoted at one end on said main frame, a driven cutter head carried by the free end of said oscillated frame, an adjustable driven cam element timed with said shingle placing means, a roller element supporting the free end of said oscillated frame on said cam element, means for holding said roller element firmly on said cam element while the cutter head is in working position.

4. In a shingle facing machine, a main frame supporting a rigid work-table provided with a work opening, means for successively placing and firmly holding shingles over said work opening, a vertically oscillated frame pivoted at one end on said main frame, a driven cutter head carried by the free end of said oscillated frame, a driven cam element timed with said shingle placing means, a roller element supporting the free end of said oscillated frame on said cam element, said oscillated frame and the vertical alinement of said roller and said cam elements being arranged to form a triangle with the supporting member of the main frame, and means for holding said roller element firmly on said cam element while the cutter head is in working position.

5. In a shingle facing machine, a main frame supporting a rigid work table provided with a work opening, means for successively placing and firmly holding shingles over said work opening, a vertically oscillated frame pivoted at one end on said main frame, a driven cutter head carried by the free end of said oscillated frame, a driven cam element timed with said shingle placing means, a roller element supporting the free end of said oscillated frame on said cam element, a guide for the free end of said oscillated frame, and means on said guide for holding said roller element firmly on said cam element while the cutter head is in working position.

6. In a shingle facing machine, a main frame supporting a rigid adjustable work table provided with a work-opening, means for successively placing and firmly holding shingles over said work-opening, a vertically oscillated frame pivoted at one end on said main frame, a driven cutter head carried by the free end of said oscillated frame, an adjustable driven cam element timed with said shingle placing means, a roller element supporting the free end of said oscillated frame on said cam element, a guide for the free end of said oscillated frame, adjustable means on said guide for holding said roller element firmly on said cam element while the cutter head is in working position.

7. In a shingle facing machine, a main frame supporting a rigid work table provided with a work opening, means for successively placing and firmly holding shingles over said work opening, a vertically oscillated frame pivoted at one end on said main frame, a driven cutter head carried by the free end of said oscillated frame, means, timed with said shingle placing means, operating said oscillated frame to place the cutter head in and out of cutting position, and means cooperating with the main frame, the oscillated frame, and the means for oscillating the latter to form a triangular rigid frame firmly holding the oscillated frame against chattering while the cutter head is in cutting position.

8. In a shingle facing machine, a main frame supporting a rigid work table provided with a work opening, means for successively placing and firmly holding shingles over said work opening, a vertically oscillated frame pivoted at one end on said main frame, a cutter head carried by the free end of said oscillated frame, means, timed with said shingle placing means, operating said oscillated frame to place the cutter head in and out of cutting position, means cooperating with the main frame, the oscillated frame, and the means for oscillating the latter to form a triangular rigid frame firmly holding the oscillated frame against chattering while the cutter head is in cutting position, and a drive including a motor for said cutter head, with the motor offset from the vertical plane of the axis of the cutter head toward the pivot axis of said oscillated frame.

GEORGE A. BERGSTROM.